(12) United States Patent
Kim et al.

(10) Patent No.: US 9,866,762 B2
(45) Date of Patent: Jan. 9, 2018

(54) IMAGE CAPTURE DEVICE HAVING IMAGE SIGNAL PROCESSOR FOR GENERATING LENS CONTROL SIGNAL

(71) Applicant: HANWHA TECHWIN CO., LTD., Changwon-si (KR)

(72) Inventors: Hongwoo Kim, Changwon-si (KR); Jaehoon Lee, Changwon-si (KR)

(73) Assignee: Hanwha Techwin Co., Ltd., Changwon-si (KR)

( * ) Notice: Subject to any disclaimer, the term of this patent is extended or adjusted under 35 U.S.C. 154(b) by 433 days.

(21) Appl. No.: 14/699,265

(22) Filed: Apr. 29, 2015

(65) Prior Publication Data

US 2015/0312544 A1  Oct. 29, 2015

(30) Foreign Application Priority Data

Apr. 29, 2014  (KR) .......................... 10-2014-0051915

(51) Int. Cl.
| | | |
|---|---|---|
| *H04N 5/238* | (2006.01) | |
| *H04N 5/374* | (2011.01) | |
| *H04N 5/376* | (2011.01) | |
| *H04N 5/232* | (2006.01) | |
| *H04N 5/355* | (2011.01) | |

(52) U.S. Cl.
CPC ............ *H04N 5/238* (2013.01); *H04N 5/232* (2013.01); *H04N 5/23212* (2013.01); *H04N 5/35581* (2013.01); *H04N 5/374* (2013.01); *H04N 5/3765* (2013.01)

(58) Field of Classification Search
None
See application file for complete search history.

(56) References Cited

U.S. PATENT DOCUMENTS

| 4,974,092 | A | * | 11/1990 | Kawamura | ........ | H04N 5/23212 |
| | | | | | | 348/349 |
| 5,353,058 | A | * | 10/1994 | Takei | .................. | H04N 5/2351 |
| | | | | | | 348/362 |
| 7,142,142 | B2 | * | 11/2006 | Petersen | ............ | A61B 5/14551 |
| | | | | | | 341/143 |
| 8,587,713 | B2 | * | 11/2013 | Park | ..................... | H04N 5/2256 |
| | | | | | | 348/371 |
| 2002/0135683 | A1 | * | 9/2002 | Tamama | .................. | G06T 1/60 |
| | | | | | | 348/222.1 |
| 2004/0061780 | A1 | * | 4/2004 | Huffman | ................ | H04N 7/181 |
| | | | | | | 348/148 |
| 2005/0083424 | A1 | * | 4/2005 | Tsukagoshi | .......... | H04N 5/3728 |
| | | | | | | 348/333.01 |

(Continued)

FOREIGN PATENT DOCUMENTS

| KR | 10-2010-0079831 A | 7/2010 |
| KR | 10-2013-0012847 A | 2/2013 |
| KR | 10-2013-0123763 A | 11/2013 |

*Primary Examiner* — Twyler Haskins
*Assistant Examiner* — Akshay Trehan
(74) *Attorney, Agent, or Firm* — Sughrue Mion, PLLC

(57) ABSTRACT

Provided is a method for controlling a video lens in an image capture device which uses a complementary metal oxide semiconductor (CMOS) image sensor. A vertical sync (Vsync) signal and a horizontal sync (Hsync) signal are separately generated and then synthesized. Thereafter, the resulting signal is synthesized with a DC level mode luminance signal to generate a lens control signal for controlling the video lens.

20 Claims, 6 Drawing Sheets

(56) References Cited

U.S. PATENT DOCUMENTS

| | | | |
|---|---|---|---|
| 2007/0018919 A1* | 1/2007 | Zavracky | G09G 3/3406 345/87 |
| 2009/0237548 A1* | 9/2009 | Watanabe | G03B 7/00 348/333.02 |
| 2009/0278983 A1* | 11/2009 | Azuma | H04N 5/04 348/521 |
| 2010/0079623 A1* | 4/2010 | Tomita | H04N 5/232 348/240.99 |

* cited by examiner

CASE OF HIGH LUMINANCE LEVEL

CASE OF LOW LUMINANCE LEVEL

IMAGE CAPTURE DEVICE HAVING IMAGE SIGNAL PROCESSOR FOR GENERATING LENS CONTROL SIGNAL

CROSS-REFERENCE TO THE RELATED APPLICATION

This application claims priority from Korean Patent Application No. 10-2014-0051915, filed on Apr. 29, 2014, in the Korean Intellectual Property Office, the disclosure of which is incorporated herein in its entirety by reference.

BACKGROUND

1. Field

Apparatuses and methods consistent with exemplary embodiments relate to image capturing and processing using a complementary metal oxide semiconductor (CMOS) image sensor, and more particularly, to controlling a video lens by using a digital signal of a CMOS image sensor.

2. Description of the Related Art

Since a charge-coupled device (CCD) image sensor outputs a video signal and a sync signal together, an output signal of the CCD image sensor may be directly used as a control signal for controlling a video lens. However, since the CMOS image sensor outputs a digital signal and has no change in an output signal thereof, it may not control the video lens. Thus, an image capture device using the CMOS image sensor may not directly control the video lens by the output signal of the CMOS image sensor, and controls the video lens by using a separate terminal for supporting a video signal without gain and on-screen display (OSD) information.

That is, an output video signal without gain and OSD information is required to control the video lens by an image capture device using the CMOS image sensor. Thus, the video lens may not be controlled when there is no separate terminal for outputting the video signal without gain and OSD information.

SUMMARY

Exemplary embodiments provide apparatuses and methods for controlling a video lens even when an image signal processor (ISP) of an image capture device using a CMOS image sensor has no separate video signal terminal without gain and OSD information.

Various aspects of the inventive concept will be set forth in part in the description which follows and, in part, will be apparent from the description, or may be learned by practice of the presented exemplary embodiments.

According to one or more exemplary embodiments, there is provided an image capture device which may include: a receiver configured to receive a digital signal from a CMOS image sensor; a sync signal generator configured to generate a vertical sync (Vsync) signal and a horizontal sync (Hsync) signal by using the digital signal and generate a composite sync (Csync) signal by synthesizing the Vsync signal and the Hsync signal; a luminance signal generator configured to generate a luminance signal included in the digital signal in a pulse width modulation (PWM) mode and convert the PWM mode luminance signal into a direct current (DC) level mode luminance signal; and a lens control signal generator configured to generate a lens control signal by synthesizing the DC level mode luminance signal and the Csync signal.

According to one or more exemplary embodiments, there is provided an image capture device which may include: a receiver configured to receive a digital signal from a CMOS image sensor; a Vsync signal generator configured to generate a Vsync pulse; a Hsync signal generator configured to generate a Hsync pulse; a Csync signal generator configured to generate a Csync signal by inputting the Vsync pulse and the Hsync pulse in a synchronized state into an AND gate; a luminance signal generator configured to convert a luminance signal included in the digital signal into a DC level mode signal of a variable amplitude; and a lens control signal generator configured to generate a lens control signal for controlling an iris of a video lens by using the DC level mode luminance signal and the Csync signal.

According to one or more exemplary embodiments, there is provided a method for controlling a video lens in an image capture device using a CMOS image sensor. The method may include: receiving a digital signal from the CMOS image sensor; generating a Vsync signal on the basis of the digital signal; generating a Hsync on the basis of the digital signal; generating a Csync signal by synthesizing the Vsync signal and the generated Hsync signal; generating a luminance signal included in the digital signal in a PWM mode and converting the PWM mode luminance signal into a DC level mode luminance signal of a variable amplitude by integrating the PWM mode luminance signal; and generating a lens control signal by loading the DC level mode luminance signal into the Csync signal at a section other than a Vsync signal section and a Hsync signal section in the Csync signal.

In the above, a DC level of the DC level mode luminance signal may decrease as a luminance of the luminance signal decreases, and the lens control signal may increase an opening amount of an iris of the video lens as the DC level of the luminance signal decreases, and may increase a closing amount of the iris of the video lens as the DC level of the luminance signal increases.

BRIEF DESCRIPTION OF THE DRAWINGS

These and/or other aspects will become apparent and more readily appreciated from the following description of exemplary embodiments, taken in conjunction with the accompanying drawings, in which.

DETAILED DESCRIPTION OF THE EXEMPLARY EMBODIMENTS

Figure 1:
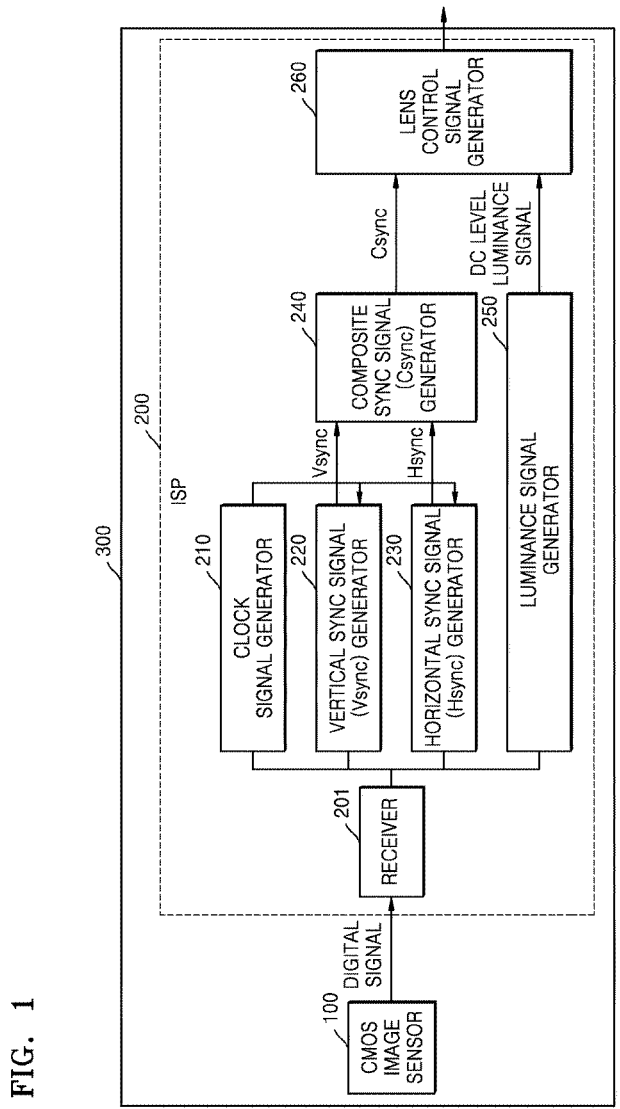
FIG. 1 illustrates an internal configuration diagram of an image capture device using a complementary metal oxide semiconductor (CMOS) image sensor, according to an exemplary embodiment.

Reference will now be made in detail to exemplary embodiments, which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain various aspects of the inventive concept.

The exemplary embodiments provide a method for controlling a video lens on the basis of a digital signal output from a complementary metal oxide semiconductor (CMOS) image sensor even without a separate output terminal.

Hereinafter, exemplary embodiments will be described with reference to the accompanying drawings. The following descriptions and the accompanying drawings are for understanding operations according to the inventive concept, and descriptions of well-known features, which may be easily implemented by those of ordinary skill in the art, will be omitted for conciseness.

Also, the specification and the drawings are not intended to limit the scope of the inventive concept, and the scope of the inventive concept is to be defined by the appended claims. For the best understanding of the inventive concept, the terms used herein are to be interpreted as having meanings and concepts that are consistent with the inventive concept.

FIG. 1 illustrates an internal configuration diagram of an image capture device which uses a CMOS image sensor, according to an exemplary embodiment.

An image capture device 300 includes a CMOS image sensor 100 and an image signal processor (ISP) 200. The image capture device 300 may be or may be included in a closed-circuit television (CCTV), a box-type CCTV, a camera, a smart phone, a computer, a notebook computer, a handheld apparatus, and any apparatus including a camera module.

The ISP 200 controls a video lens by outputting a lens control signal for controlling an iris of the video lens by receiving a digital signal from the CMOS image sensor 100.

In detail, the ISP 200 includes a receiver 201, a clock signal generator 210, a vertical sync (Vsync) signal generator 220, a horizontal sync (Hsync) signal generator 230, a composite sync (Csync) signal generator 240, a luminance signal generator 250, and a lens control signal generator 260.

The ISP 200 receives a digital signal from the CMOS image sensor 100 through the receiver 201. The Csync signal generator 240 generates a Csync signal by using a Vsync signal and a Hsync signal. The luminance signal generator 250 converts a luminance signal, included in the digital signal received from the CMOS image sensor 100, into a direct current (DC) level mode luminance signal. Thereafter, the lens control signal generator 260 generates a lens control signal by synthesizing the DC level mode luminance signal and the Csync signal.

Since a DC level in a signal increases in a high-luminance image condition and decreases in a low-luminance image condition, the image capture device 300 controls the iris of the video lens by using the level of the DC level mode luminance signal included in the lens control signal.

The main functions of the respective components of the ISP 200 will be described below. The Csync signal generator 240 will be described with reference to FIGS. 2 and 3; the luminance signal generator 250 will be described with reference to FIGS. 4 and 5; and the lens control signal generator 260 will be described with reference to FIGS. 6 and 7.

The receiver 201 receives a digital signal from the CMOS image sensor 100.

According to an exemplary embodiment, without a separate image output, on the basis of the digital signal received from the CMOS image sensor 100, the image capture device 300 generates the Vsync signal by the Vsync signal generator 220 and generates the Hsync signal by the Hsync signal generator 230.

The Vsync signal generator 220 generates a Vsync pulse instructing frame-by-frame reading of the digital signal, and the Hsync signal generator 230 generates a Hsync pulse instructing line-by-line reading of a frame in the digital signal.

The clock signal generator 210 generates a clock signal for synchronization of the Vsync signal generated by the Vsync signal generator 220 and the Hsync signal generated by the Hsync signal generator 230.

The Csync signal generator 240 may generate a Csync signal by using the clock signal generated by the clock signal generator 210.

Figure 2:
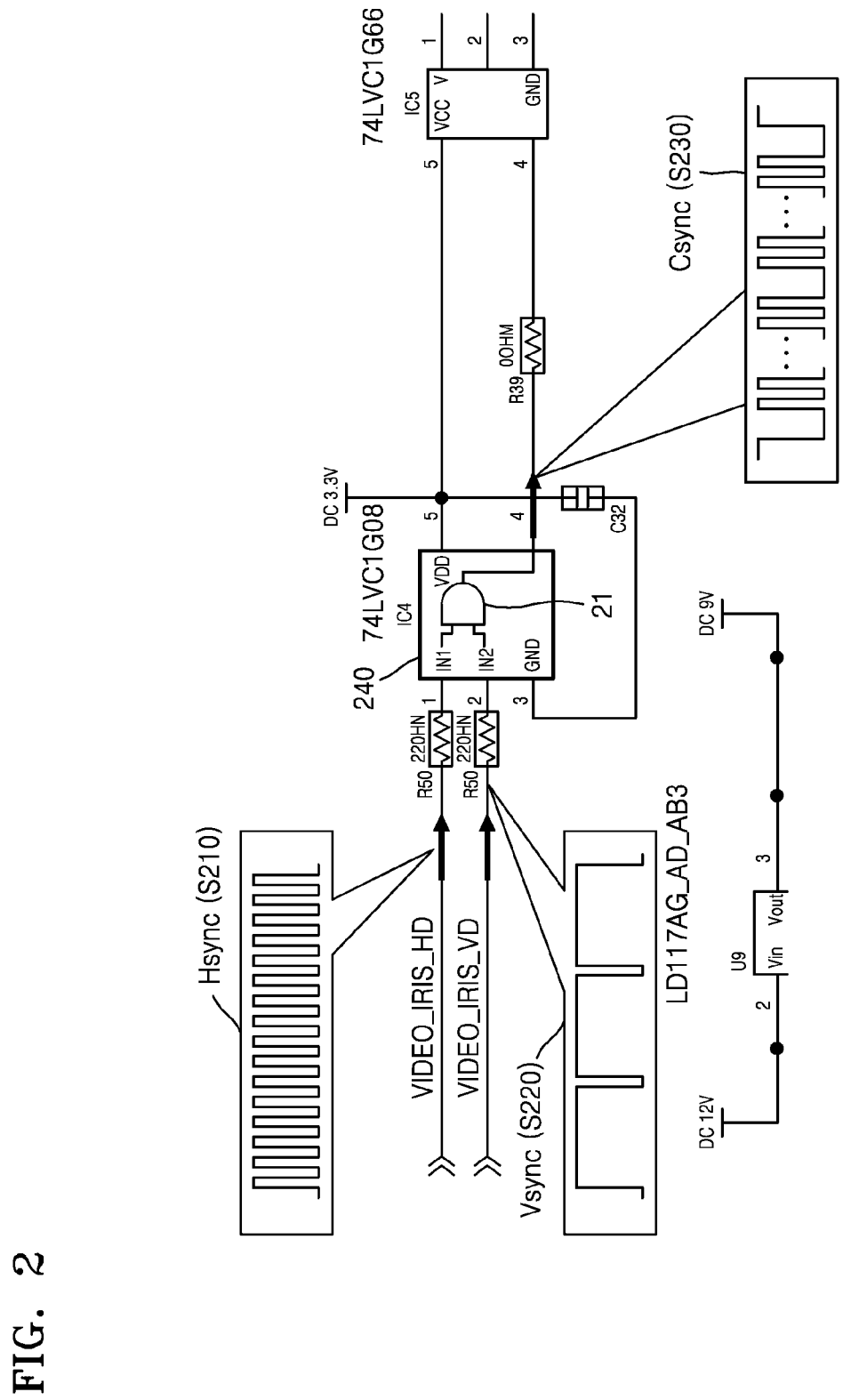
FIGS. 2, 3A, and 3B illustrate examples of an output and a circuit diagram of a sync signal generator in an image signal processing (ISP) unit, according to an exemplary embodiment.

Referring to FIG. 2, the Csync signal generator 240 (see FIG. 1) or 200 (see FIG. 2) generates a Csync signal S230 by synthesizing a Hsync signal S210 and a Vsync signal S220. In this case, the Hsync signal S210 and the Vsync signal S220 are input in a synchronized state into the Csync signal generator 240 (see FIG. 1) or 200 (see FIG. 2) to be synthesized into the Csync signal.

According to an exemplary embodiment, the Csync signal generator 200 (see FIG. 2) may include an AND gate 210. An output of a pulse width modulation (PWM) terminal for generating the Hsync signal S210 and an output of a PWM terminal for generating the Vsync signal S220 are connected to the AND gate 210 to generate the Csync signal S230.

According to an exemplary embodiment, the phase of the Hsync signal S210 that has passed the Csync signal generator 240 (see FIG. 1) or 200 (see FIG. 2) may be equal to the phase of the Vsync pulse S220 that has passed the Csync signal generator 240 (see FIG. 1) or 200 (see FIG. 2).

According to an exemplary embodiment, the Vsync signal S220 may have a frequency of 50 Hz and the Hsync signal S210 may have a frequency of any multiple of 50 Hz so that the Vsync signal S220 and the Hsync pulse S210, which have passed the AND gate 210, may maintain the same phase.

Figure 8:
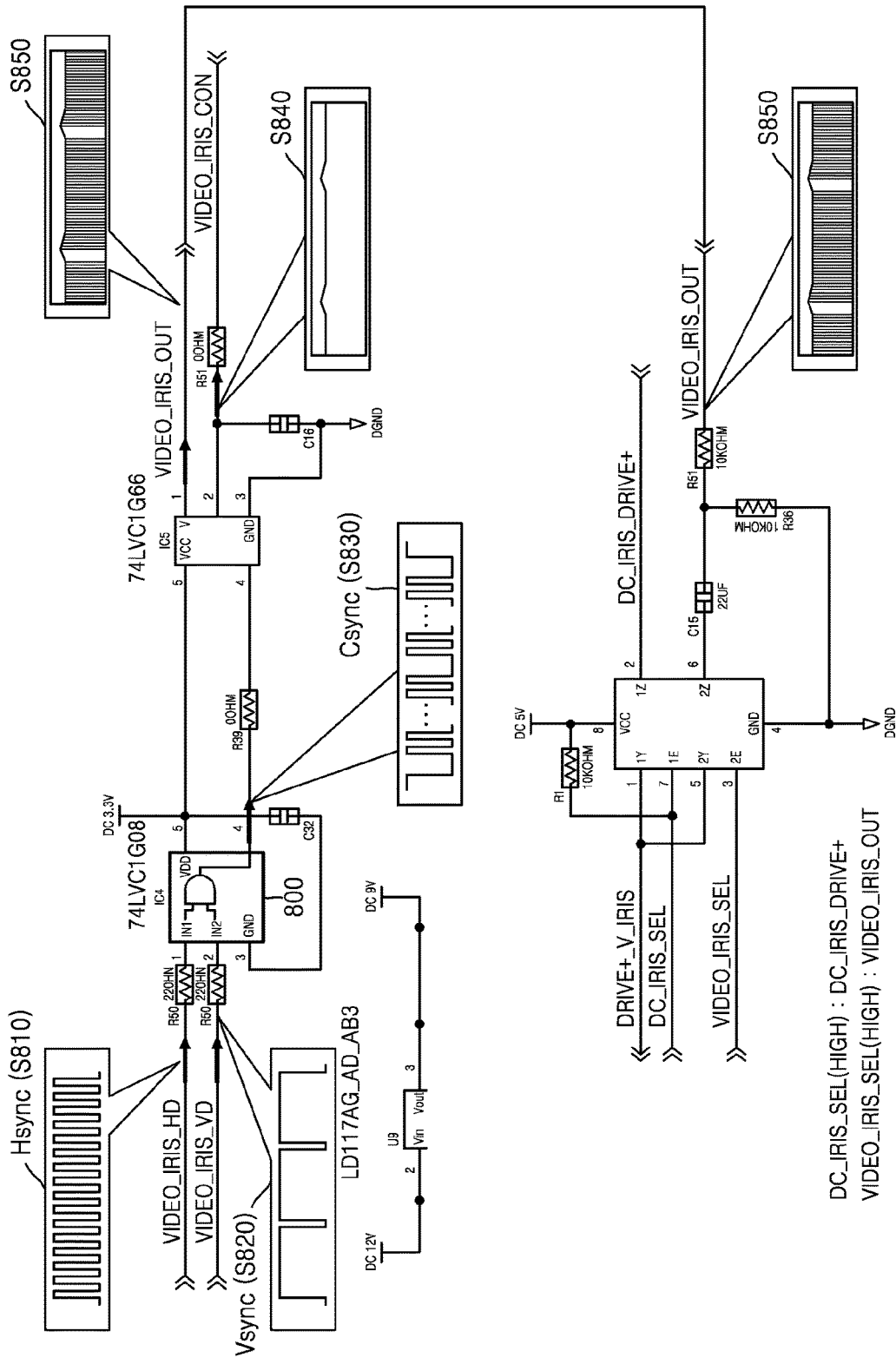
FIG. 8 illustrates a circuit diagram illustrating a process for controlling a video lens by receiving a digital output of a CMOS image sensor by an ISP 200 (see FIG. 1) of an image capture device 300 (see FIG. 1), according to an exemplary embodiment.

Referring to FIG. 8, a Hsync signal (VIDEO_IRIS_HD) S810 is set to 20 KHz, and a Vsync signal (VIDEO_IRIS_VD) S820 is set to 50 Hz.

The luminance signal generator 250 receives a digital signal output from the CMOS image sensor 100 through the receiver 201 and generates a luminance signal included in the output digital signal of the CMOS image sensor 100 in a PWM mode.

According to an exemplary embodiment, the luminance signal generator 250 generates a PWM mode signal having a luminance-dependent duty at a reference frequency of about 15 KHz with respect to a pure luminance signal without the application of an on-screen display (OSD) and a gain included in the digital signal data output from the CMOS image sensor 100.

Figure 3A:
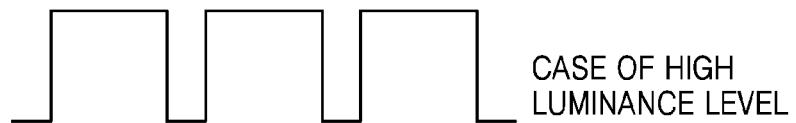

The PWM mode luminance signal will be described with reference to FIGS. 3A and 3B. FIG. 3A illustrates a PWM mode luminance signal in a case where a luminance level is high according to an exemplary embodiment, and FIG. 3B illustrates a PWM mode luminance signal in a case where the luminance level is low according to an exemplary embodiment.

The luminance signal generator 250 converts the PWM mode luminance signal into a DC level mode signal of a variable amplitude by integrating the PWM mode luminance signal.

Figure 3B:
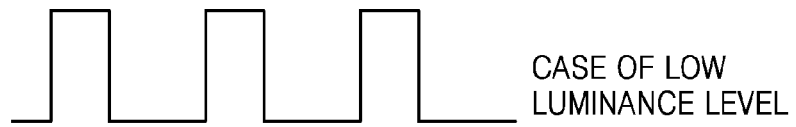
Figure 4:
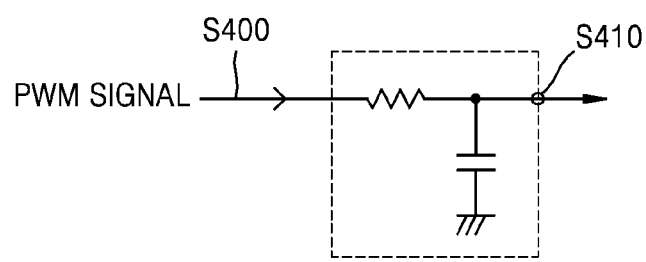
FIG. 4 illustrates a circuit diagram for integrating a luminance signal illustrated in FIGS. 3A and 3B, according to an exemplary embodiment.

FIG. 4 illustrates a circuit diagram for integrating the PWM mode luminance signal illustrated in FIGS. 3A and 3B. In this integration circuit, a PWM mode luminance signal S400 is input and a DC level mode luminance signal S410 is output.

Figure 5:
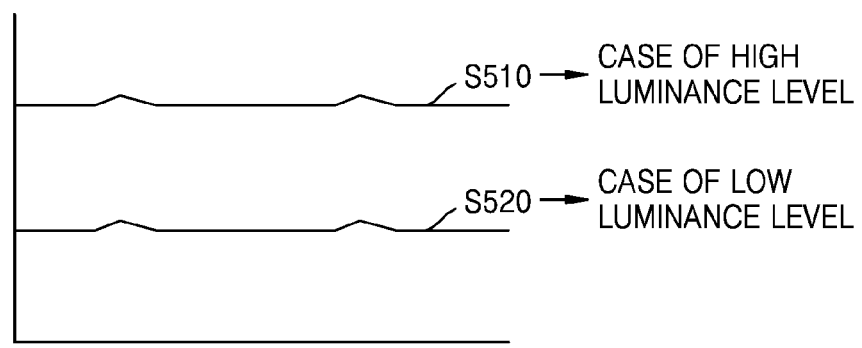
FIG. 5 illustrates an example of a direct current (DC) level mode luminance signal output from a luminance signal generator, according to an exemplary embodiment.

FIG. 5 illustrates an example of the DC level mode luminance signal output from the luminance signal generator 250 (see FIG. 2). In a graph of FIG. 5, an X axis represents time and a Y axis represents a voltage Vdc. Referring to the graph of FIG. 5, when the luminance level is high, a signal S510 having a high DC level is output; and when the luminance level is low, a signal S520 having a low DC level is output.

According to an exemplary embodiment, when the luminance level is high in the case of about 45 IRE to about 110 IRE, a signal having a high DC level of about 0.5 V to about 1.3 V is output. When the luminance level is low in the case of about 0 IRE to about 45 IRE, a signal having a low DC level of about 0 V to about 0.5 V is output.

That is, as the luminance of an image increases, the output level of the DC level mode luminance signal increases. Also, as the luminance of an image decreases, the output level of the DC level mode luminance signal decreases. Thus, the DC level of the luminance signal increases as the brightness of an image increases, and the DC level of the luminance signal decreases as the brightness of an image decreases. As an example, the DC level increases in a bright image of about 45 IRE to about 110 IRE, and the DC level decreases in a dark image of about 0 IRE to about 45 IRE.

The lens control signal generator 260 generates a lens control signal for controlling the video lens by synthesizing the luminance signal generated by the luminance signal generator 250 and the Csync signal generated by the Csync signal generator 240.

In detail, the lens control signal for controlling the video lens is generated by adding information of the DC level mode luminance signal output from the luminance signal generator 250 into the Csync signal at a section other than a Vsync signal section and a Hsync signal section in the Csync signal. An example of the lens control signal is a lens control signal S850 of FIG. 8.

Figure 6:
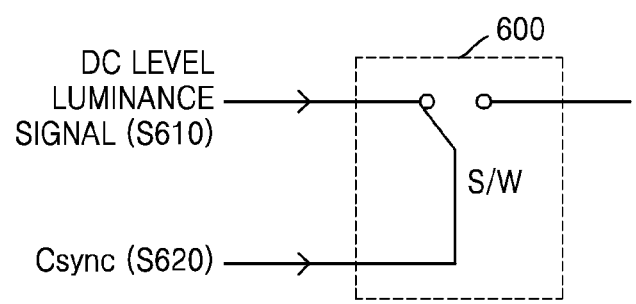
FIG. 6 illustrates an example of an analog switching circuit, according to an exemplary embodiment.

The lens control signal generator 260 may include an analog switching circuit 600 illustrated in FIG. 6. By using the analog switching circuit 600, on the basis of a DC level mode luminance signal S610 and a Csync signal S620, a corresponding output signal is output according to the level of the DC level mode luminance signal S610.

Figures 7A, 7B:
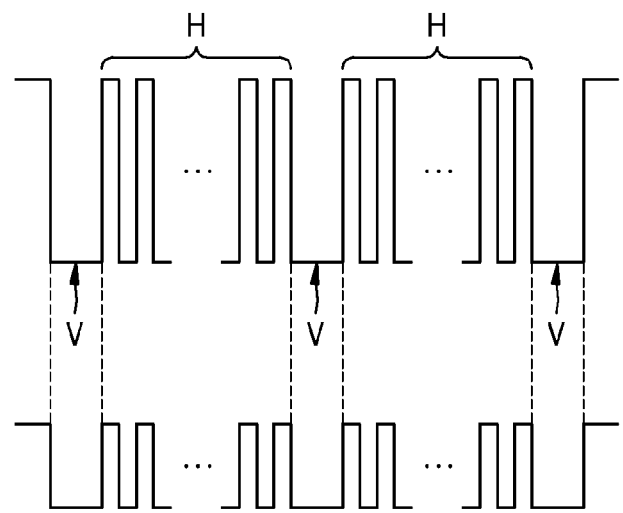
FIGS. 7A and 7B illustrate a lens control signal output that is output according to an example of a case where the DC level of the luminance signal is higher than a predetermined threshold value and an example of a case where the DC level of the luminance signal is lower than the predetermined threshold value, according to exemplary embodiments.

FIG. 7A illustrates an example of a lens control signal in a case where the DC level of the luminance signal is high. FIG. 7B illustrates an example of a lens control signal in a case where the DC level of the luminance signal is low. According to an exemplary embodiment, the lens control signal may control the video lens since the signal level thereof changes according to a change in the DC level of the luminance signal.

As an example, when the DC level of the luminance signal decreases, the lens control signal increases an opening amount of the iris; and when the DC level of the luminance signal increases, the lens control signal increases a closing amount of the iris.

The DC level of the DC level mode luminance signal decreases as the luminance of the luminance signal decreases, and the lens control signal increases the opening amount of the iris of the video lens. For example, when an operation voltage is output as a DC voltage of about 0 V to about 0.5 V, the iris may be opened so that the DC level approaches a target DC level. In this case, an IRE reference target DC level may be set to about 45.

The DC level of the DC level mode luminance signal increases as the luminance of the luminance signal increases, and the lens control signal increases the closing amount of the iris of the video lens.

For example, when an operation voltage is output as a DC voltage of about 0 V to about 0.5 V, the iris may be closed so that the DC level approaches the target DC level. In this case, the IRE reference target DC level may be set to about 45.

FIG. 8 illustrates a circuit diagram illustrating a process for controlling the video lens by receiving a digital output of the CMOS image sensor by the ISP 200 (see FIG. 1) of the image capture device 300 (see FIG. 1), according to an exemplary embodiment.

The Hsync signal S810 and the Vsync signal S820 are synchronized and synthesized into a Csync signal 5830 by a signal synthesizer 800. Thereafter, a PWM mode luminance signal is generated from luminance information of the digital signal of the CMOS image sensor, and the generated PWM mode luminance signal is integrated to convert the PWM mode luminance signal into a DC level mode signal of a variable amplitude (S840).

Thereafter, a lens control signal S850 is generated by loading the DC level mode luminance signal into the section other than the Vsync signal section and the Hsync signal section in the Csync signal. Thereafter, the video lens is controlled on the basis of the lens control signal S850.

As described above, according to the above exemplary embodiments, in the image capture device using the CMOS image sensor, the video lens may be controlled even without a separate terminal.

The operations or steps of the process described above in reference to FIG. 8 can be embodied as computer readable codes on a computer readable recording medium, or to be transmitted through a transmission medium. The computer readable recording medium is any data storage device that can store data which can be thereafter read by a computer system. Examples of the computer readable recording medium include read-only memory (ROM), random-access memory (RAM), compact disc (CD)-ROM, digital versatile disc (DVD), magnetic tape, floppy disk, and optical data storage device, not being limited thereto. The transmission medium can include carrier waves transmitted through the Internet or various types of communication channel. The computer readable recording medium can also be distributed over network coupled computer systems so that the computer readable code is stored and executed in a distributed fashion.

At least one of the components, elements or units represented by a block as illustrated in FIG. 1 may be embodied as various numbers of hardware, software and/or firmware structures that execute respective functions described above, according to an exemplary embodiment. For example, at least one of these components, elements or units may use a direct circuit structure, such as a memory, processing, logic, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions, and executed by one or more microprocessors or other control apparatuses. Also, at least one of these components, elements or units may further include a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these component, elements or units may be performed by another of these components, element or units. Further, although a bus is not illustrated in the above block diagrams, communication between the components, elements or units may be performed through the bus. Functional aspects of the above exemplary embodiments may be implemented in algorithms that execute on one or more processors. Furthermore, the components, elements or units represented by a block or processing steps may employ any number of related art techniques for electronics configuration, signal processing and/or control, data processing and the like.

It should be understood that the exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope of the inventive concept as defined by the following claims.

What is claimed is:

1. An image capture device comprising:
    a receiver configured to receive a digital signal from a complementary metal oxide semiconductor (CMOS) image sensor;
    a sync signal generator configured to generate a vertical sync (Vsync) signal and a horizontal sync (Hsync) signal by using the digital signal and generate a composite sync (Csync) signal by synthesizing the Vsync signal and the Hsync signal;
    a luminance signal generator configured to generate a luminance signal included in the digital signal in a pulse width modulation (PWM) mode and convert the PWM mode luminance signal into a direct current (DC) level mode luminance signal; and
    a lens control signal generator configured to generate a lens control signal by synthesizing the DC level mode luminance signal and the Csync signal.

2. The image capture device of claim 1, wherein the Vsync signal and the Hsync signal are input in a synchronized state into an AND gate to be synthesized into the Csync signal.

3. The image capture device of claim 1, wherein in the luminance signal generator, a DC level value changes as a luminance changes.

4. The image capture device of claim 1, wherein a duty of the PWM mode luminance signal changes according to a luminance signal size change.

5. The image capture device of claim 1, wherein the lens control signal increases an opening amount of an iris of a video lens as a DC level of the luminance signal decreases, and
    wherein the lens control signal decreases the opening amount of the iris of the video lens as the DC level of the luminance signal increase.

6. The image capture device of claim 1, wherein the lens control signal generator is configured to synthesize the DC level mode luminance signal and the Csync signal by loading the DC level mode luminance signal in the Csync signal at a section other than a Vsync signal section and a Hsync signal section in the Csync signal.

7. The image capture device of claim 1, wherein the Vsync signal and the Hsync signal are of a PWM mode.

8. The image capture device of claim 1, wherein the luminance signal generator is configured to convert the PWM mode luminance signal into the DC level mode luminance signal by processing the PWM mode luminance signal at an integration circuit.

9. An image capture device comprising:
    a receiver configured to receive a digital signal from a complementary metal oxide semiconductor (CMOS) image sensor;
    a vertical sync (Vsync) signal generator configured to generate a Vsync pulse;
    a horizontal sync (Hsync) signal generator configured to generate a Hsync pulse;
    a composite sync (Csync) signal generator configured to generate a Csync signal by inputting the Vsync pulse and the Hsync pulse in a synchronized state into an AND gate;
    a luminance signal generator configured to convert a luminance signal included in the digital signal into a direct current (DC) level mode signal of a variable amplitude; and
    a lens control signal generator configured to generate a lens control signal for controlling an iris of a video lens by using the DC level mode luminance signal and the Csync signal.

10. The image capture device of claim 9, wherein the luminance signal generator comprises an integration circuit configured to receive an input of a pulse width modulation (PWM) mode luminance signal and output the DC level mode luminance signal,
    wherein the PWM mode luminance signal is generated on the basis of the luminance signal included in the digital signal.

11. The image capture device of claim 10, wherein a duty of the PWM mode luminance signal changes according to a luminance signal size change.

12. The image capture device of claim 9, wherein the lens control signal generator is configured to generate the lens control signal by loading the DC level mode luminance signal into the Csync signal at a section other than a Vsync signal section and a Hsync signal section in the Csync signal.

13. The image capture device of claim 9, further comprising a clock signal generator configured to generate a clock signal for synchronization of the Vsync pulse and the Hsync pulse.

14. The image capture device of claim 9, wherein the Vsync signal generator and the Hsync signal generator are configured such that a phase of the Vsync pulse that has passed the Csync signal generator is equal to a phase of the Hsync pulse that has passed the Csync signal generator.

15. The image capture device of claim 9, wherein in the luminance signal generator, a DC level value changed as a luminance changes.

16. The image capture device of claim 9, wherein the lens control signal increases an opening amount of the iris of the video lens as a DC level of the DC level mode luminance signal decreases, and
wherein the lens control signal increases a closing amount of the iris of the video lens as the DC level of the DC level mode luminance signal increases.

17. A method for controlling a video lens in an image capture device using a complementary metal oxide semiconductor (CMOS) image sensor, the method comprising:
receiving a digital signal from the CMOS image sensor;
generating a vertical sync (Vsync) signal on the basis of the digital signal;
generating a horizontal sync (Hsync) on the basis of the digital signal;
generating a composite sync (Csync) signal by synthesizing the Vsync signal and the generated Hsync signal;
generating a luminance signal included in the digital signal in a pulse width modulation (PWM) mode and converting the PWM mode luminance signal into a direct current (DC) level mode luminance signal of a variable amplitude by integrating the PWM mode luminance signal; and
generating a lens control signal by loading the DC level mode luminance signal into the Csync signal at a section other than a Vsync signal section and a Hsync signal section in the Csync signal.

18. The method of claim 17, further comprising controlling an iris of the video lens in the image capture device by using the lens control signal.

19. The method of claim 17, wherein a DC level of the DC level mode luminance signal decreases as a luminance of the luminance signal decreases, and the lens control signal is configured to increase an opening amount of an iris of the video lens as the DC level of the luminance signal decreases.

20. The method of claim 17, wherein a DC level of the DC level mode luminance signal increases as a luminance of the luminance signal increases, and the lens control signal is configured to increase a closing amount of an iris of the video lens as the DC level of the luminance signal increases.

* * * * *